(12) United States Patent
Ye et al.

(10) Patent No.: US 10,956,600 B2
(45) Date of Patent: Mar. 23, 2021

(54) HIGHLY AVAILABLE ENCRYPTION FRAMEWORK FOR MULTIPLE DIFFERENT COMPUTING ENVIRONMENTS

(71) Applicant: salesforce.com, inc., San Francisco, CA (US)

(72) Inventors: Lei Ye, San Francisco, CA (US); David Baiyor Murray, San Francisco, CA (US); Vineet Deokaran Chaudhary, San Francisco, CA (US); Xiongjian Fu, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 211 days.

(21) Appl. No.: 16/176,514

(22) Filed: Oct. 31, 2018

(65) Prior Publication Data

US 2020/0134223 A1   Apr. 30, 2020

(51) Int. Cl.
*G06F 21/62* (2013.01)
*H04L 9/08* (2006.01)
*H04L 9/14* (2006.01)

(52) U.S. Cl.
CPC .......... *G06F 21/6227* (2013.01); *H04L 9/083* (2013.01); *H04L 9/0891* (2013.01); *H04L 9/0894* (2013.01); *H04L 9/14* (2013.01)

(58) Field of Classification Search
CPC ... G06F 21/6227; H04L 9/083; H04L 9/0891; H04L 9/0894; H04L 9/14
USPC ........................................................ 713/164
See application file for complete search history.

(56) References Cited

U.S. PATENT DOCUMENTS

| 7,730,478 | B2 | 6/2010 | Weissman |
| 7,779,039 | B2 | 8/2010 | Weissman et al. |
| 9,071,429 | B1 * | 6/2015 | Roth ..................... H04L 9/0891 |
| 9,141,814 | B1 * | 9/2015 | Murray ............... G06F 11/2046 |
| 9,413,730 | B1 * | 8/2016 | Narayan ............... H04L 63/068 |
| 9,722,974 | B1 * | 8/2017 | Fuller ................... H04L 63/061 |
| 10,467,422 | B1 * | 11/2019 | Roth ..................... G06F 21/602 |
| 10,530,578 | B2 * | 1/2020 | Keshava ............... G06F 21/604 |
| 10,594,668 | B1 * | 3/2020 | Sanchez ............... H04L 63/083 |
| 10,771,252 | B1 * | 9/2020 | Teng ..................... H04L 9/0897 |
| 2010/0257351 | A1 * | 10/2010 | O'Connor ............. H04L 9/0894 |
| | | | 713/150 |

(Continued)

*Primary Examiner* — Kambiz Zand
*Assistant Examiner* — Mahabub S Ahmed
(74) *Attorney, Agent, or Firm* — Haynes and Boone, LLP (57) ABSTRACT

A system is provided for data object encryption. The system includes an encryption framework available across a plurality of runtime environments. The system is configured to receive a data object in one of the plurality of runtime environments, wherein the data object is capable of being encrypted using a content encryption key and determine an encryption module implemented in the encryption framework that is compatible with the one of the plurality of runtime environment, wherein the encryption module comprises a key service provider that provides a master key and a key wrapping algorithm for the content encryption key in the runtime environment. The system is further configured to encrypt the data object using the content encryption key, encrypt the content encryption key using the master key and key wrapping algorithm, and write the encrypted data object to networked database storage.

18 Claims, 7 Drawing Sheets

(56) References Cited

U.S. PATENT DOCUMENTS

| | | | |
|---|---|---|---|
| 2011/0252234 A1* | 10/2011 | De Atley | G06F 21/602 713/165 |
| 2011/0261964 A1* | 10/2011 | Kahler | H04L 9/0825 380/286 |
| 2012/0140923 A1* | 6/2012 | Lee | H04L 9/0894 380/45 |
| 2013/0136258 A1* | 5/2013 | Grube | H04L 67/306 380/44 |
| 2013/0247216 A1* | 9/2013 | Cinarkaya | G06F 16/282 726/27 |
| 2014/0169554 A1* | 6/2014 | Scarisbrick | H04L 9/0822 380/28 |
| 2014/0229737 A1* | 8/2014 | Roth | H04L 9/0618 713/176 |
| 2015/0134795 A1* | 5/2015 | Theimer | G06F 16/254 709/223 |
| 2015/0220745 A1* | 8/2015 | Nellitheertha | G06F 21/602 713/193 |
| 2015/0356305 A1* | 12/2015 | Volvovski | G06F 21/6218 713/164 |
| 2016/0036826 A1* | 2/2016 | Pogorelik | H04L 63/0428 726/1 |
| 2016/0062918 A1* | 3/2016 | Androulaki | G06F 12/1408 713/193 |
| 2016/0119291 A1* | 4/2016 | Zollinger | H04L 9/3228 713/171 |
| 2016/0173282 A1* | 6/2016 | Circello | H04L 9/0894 380/44 |
| 2016/0191237 A1* | 6/2016 | Roth | H04L 9/0891 380/278 |
| 2017/0004312 A1* | 1/2017 | Agarwal | H04W 12/001 |
| 2017/0083718 A1* | 3/2017 | Peddada | G06F 21/6227 |
| 2018/0034792 A1* | 2/2018 | Gupta | G06F 21/602 |
| 2018/0048468 A1* | 2/2018 | Baptist | G06F 21/6218 |
| 2018/0048470 A1* | 2/2018 | Bower | G06F 21/72 |
| 2018/0082076 A1* | 3/2018 | Murray | H04L 9/0643 |
| 2018/0115537 A1* | 4/2018 | Zhu | H04L 9/0894 |
| 2018/0270060 A1* | 9/2018 | Gray | H04L 63/06 |
| 2018/0287785 A1* | 10/2018 | Pfannenschmidt | H04L 9/0822 |
| 2018/0351928 A1* | 12/2018 | Yoo | H04L 9/0894 |
| 2019/0158474 A1* | 5/2019 | Kashyap | H04L 9/088 |
| 2019/0229902 A1* | 7/2019 | Zheng | H04L 9/0822 |
| 2019/0318102 A1* | 10/2019 | Araya | H04L 9/088 |
| 2019/0394024 A1* | 12/2019 | Vepa | H04L 9/083 |
| 2020/0026873 A1* | 1/2020 | Jain | G06F 21/602 |
| 2020/0034560 A1* | 1/2020 | Natanzon | H04L 9/083 |
| 2020/0057859 A1* | 2/2020 | Richards | H04L 9/0836 |
| 2020/0175179 A1* | 6/2020 | Iyer | H04L 9/0618 |

* cited by examiner

… … … … … …
HIGHLY AVAILABLE ENCRYPTION FRAMEWORK FOR MULTIPLE DIFFERENT COMPUTING ENVIRONMENTS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates generally to encryption systems for data objects, and more specifically to a system and method for a highly available encryption framework that is available across multiple different runtime environments and allows encryption using different encryption modules required by the runtime environments.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

A database system can store data or information. In a customer relationship management (CRM) database, for example, this data or information can include records or data for customers. In a database management system for a CRM database, blob data may refer to customer's text, content (e.g., image, multimedia, audio, etc.), attachment, application, or other files and documents that a customer may utilize and store with the system. When a user (e.g., a customer) provides data, the data may be stored to a database. However, the data may be sensitive or confidential, and breaches of data may risk disclosures of important customer information, fraud, and value loss to the CRM system. Existing encryption services may run well if the single key service provider is dependable but does not offer easy extensibility to work with other key service providers. Services provided by a CRM in different computing runtime environments may also require different cryptographic requirements, and thus some key service providers may not be available across all services provided by a particular client. Moreover, an issue with a single key service provider may cause issues in encryption and decryption availability and ease of use. In order to be regulation compliant, all of a CRM services may be required to offer encryption to user blob data when stored in a networked database storage. As such, the CRM system must offer clients a flexible and widely available process to provide data encryption.

In the figures, elements having the same designations have the same or similar functions.

DETAILED DESCRIPTION

This description and the accompanying drawings that illustrate aspects, embodiments, implementations, or applications should not be taken as limiting—the claims define the protected invention. Various mechanical, compositional, structural, electrical, and operational changes may be made without departing from the spirit and scope of this description and the claims. In some instances, well-known circuits, structures, or techniques have not been shown or described in detail as these are known to one skilled in the art. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Overview

For a database system accessible by a plurality of separate organizations, such as a multi-tenant database system, methods, data structures, and systems are provided for encrypting user blob data client-side for storage by the multi-tenant database system in a secure manner. The database system stores multiple objects that are accessible by users of the database system in an encrypted fashion. The objects may be generated, for example, by users or customers of the database systems based on customer input and actions with a client-side application and the system. To provide encryption of the data when written to the multi-tenant system, a client application for the system provides an encryption framework that executes client-side and provides wide availability across multiple runtime environments using pluggable encryption modules. These encryption modules allow for wrapping (i.e., encryption) of content encryption keys (CEKs) generated for blob data at a time of encryption. The encryption modules encrypt a CEK after data encryption, where the wrapped CEK is then stored with encryption metadata allowing for identification of the used encryption module(s) and key service provider for unwrapping of the CEK and decryption of the data. Thus, a database system for customer relationship management (CRM) may store customer blob data in an encrypted manner that may be widely available depending on client device runtime environment.

The embodiments described herein provide methods, computer program products, and computer database systems for a highly available encryption framework for multiple different computing environments is provided. A user may utilize a client-side application to interact with a multi-tenant database system. The client-side layer may provide an encryption framework that is highly available across multiple runtime environments on the client so that encryption of user blob data may be provided. For example, the encryption framework may utilize one or more encryption modules to wrap or encrypt a CEK when data encryption occurs, and may write the encrypted data, wrapped CEK, and metadata to a database. The framework may also be used to retrieve the encrypted blob data and decrypt the data client-side for output.

According to some embodiments, in a multi-tenant database system accessible by a plurality of separate and distinct organizations, a widely available encryption framework provides data encryption. The data encryption allows user blob data to be transmitted and stored in a secure manner, thereby enhancing the experience of users associated with the organization and security of their data.

Example Environment

The system and methods of the present disclosure can include, incorporate, or operate in conjunction with or in the environment of a database, which in some embodiments can implemented as a multi-tenant, cloud-based architecture. Multi-tenant cloud-based architectures have been developed to improve collaboration, integration, and community-based cooperation between customer tenants without sacrificing data security. Generally speaking, multi-tenancy refers to a system where a single hardware and software platform simultaneously supports multiple user groups (also referred to as "organizations" or "tenants") from a common data storage element (also referred to as a "multi-tenant database"). The multi-tenant design provides a number of advantages over conventional server virtualization systems. First, the multi-tenant platform operator can often make improvements to the platform based upon collective information from the entire tenant community. Additionally, because all users in the multi-tenant environment execute applications within a common processing space, it is relatively easy to grant or deny access to specific sets of data for any user within the multi-tenant platform, thereby improving collaboration and integration between applications and the data managed by the various applications. The multi-tenant architecture therefore allows convenient and cost effective sharing of similar application features between multiple sets of users.

Figure 1:
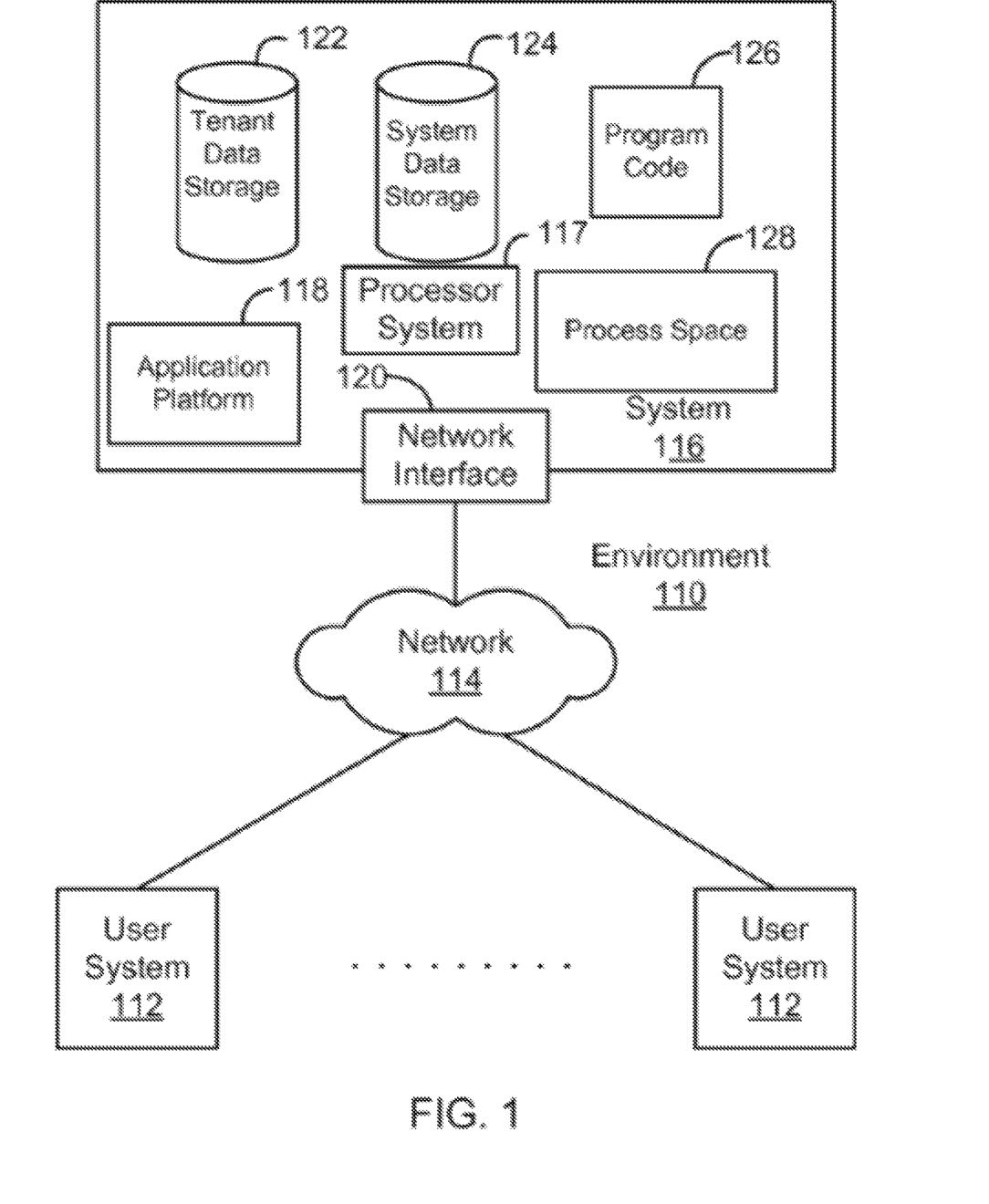
FIG. 1 illustrates a block diagram of an example environment wherein systems and methods for storing and retrieving encrypted blob data may be used according to some embodiments.

FIG. 1 illustrates a block diagram of an example environment 110 according to some embodiments. Environment 110 may include user systems 112, network 114, system 116, processor system 117, application platform 118, network interface 120, tenant data storage 122, system data storage 124, program code 126, and process space 128 for executing database system processes and tenant-specific processes, such as running applications as part of an application hosting service. In other embodiments, environment 110 may not have all of the components listed and/or may have other elements instead of, or in addition to, those listed above.

In some embodiments, the environment 110 is an environment in which an on-demand database service exists. A user system 112 may be any machine or system that is used by a user to access a database user system. For example, any of user systems 112 can be a handheld computing device, a mobile phone, a laptop computer, a notepad computer, a work station, and/or a network of computing devices. As illustrated in FIG. 1 (and in more detail in FIG. 2) user systems 112 might interact via a network 114 with an on-demand database service, which is system 116.

An on-demand database service, such as that which can be implemented using the system 116, is a service that is made available to users outside of the enterprise(s) that own, maintain or provide access to the system 116. As described above, such users do not need to necessarily be concerned with building and/or maintaining the system 116. Instead, resources provided by the system 116 may be available for such users' use when the users need services provided by the system 116—e.g., on the demand of the users. Some on-demand database services may store information from one or more tenants stored into tables of a common database image to form a multi-tenant database system (MTS). Accordingly, the "on-demand database service 116" and the "system 116" will be used interchangeably herein. The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image may include one or more database objects. A relational data base management system (RDBMS) or the equivalent may execute storage and retrieval of information against the data base object(s).

The application platform 118 may be a framework that allows the applications of system 116 to run, such as the hardware and/or software infrastructure, e.g., the operating system. In an embodiment, on-demand database service 116 may include an application platform 118 that enables creating, managing, and executing one or more applications developed by the provider of the on-demand database service, users accessing the on-demand database service via user systems 112, or third party application developers accessing the on-demand database service via user systems 112.

The users of user systems 112 may differ in their respective capacities, and the capacity of a particular user system 112 might be entirely determined by permissions (permission levels) for the current user. For example, where a salesperson is using a particular user system 112 to interact with system 116, that user system has the capacities allotted to that salesperson. However, while an administrator is using that user system 112 to interact with system 116, that user system 112 has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

The network 114 is any network or combination of networks of devices that communicate with one another. For example, the network 114 can be any one or any combination of a local area network (LAN), wide area network (WAN), telephone network, wireless network, point-to-point network, star network, token ring network, hub network, or other appropriate configuration. As the most common type of computer network in current use is a transfer control protocol and Internet protocol (TCP/IP) network, such as the global inter network of networks often referred to as the "Internet" with a capital "I" that network will be used in many of the examples herein. However, it should be understood that the networks that the present embodiments might use are not so limited, although TCP/IP is a frequently implemented protocol.

The user systems 112 might communicate with system 116 using TCP/IP and, at a higher network level, use other common Internet protocols to communicate. Such as hypertext transfer protocol (HTTP), file transfer protocol (FTP), Andrew file system (AFS), wireless application protocol (WAP), etc. In an example where HTTP is used, user system 112 might include an HTTP client commonly referred to as a "browser" for sending and receiving HTTP messages to and from an HTTP server at system 116. Such an HTTP server might be implemented as the sole network interface between system 116 and network 114, but other techniques might be used as well or instead. In some implementations, the interface between system 116 and network 114 includes load sharing functionality, such as round-robin HTTP request distributors to balance loads and distribute incoming HTTP requests evenly over a plurality of servers. At least for the users that are accessing that server, each of the plurality of servers has access to the MTS data; however, other alternative configurations may be used instead.

In some embodiments, the system 116, shown in FIG. 1, implements a web-based customer relationship management (CRM) system. For example, in one embodiment, system 116 includes application servers configured to implement and execute CRM software applications as well as provide related data, code, forms, webpages and other information to and from user systems 112 and to store to, and retrieve from, a database system related data, objects, and web page content. With a multi-tenant system, data for multiple tenants may be stored in the same physical database object. However, tenant data typically is arranged so that data of one tenant is kept logically separate from that of other tenants so that one tenant does not have access to another tenant's data, unless such data is expressly shared. In certain embodiments, the system 116 implements applications other than, or in addition to, a CRM application. For example, system 16 may provide tenant access to multiple hosted (standard and custom) applications. User (or third party developer) applications, which may or may not include CRM, may be supported by the application platform 118, which manages creation, storage of the applications into one or more database objects, and executing of the applications in a virtual machine in the process space of the system 116.

One arrangement for elements of the system 116 is shown in FIG. 1, including the network interface 120, the application platform 118, the tenant data storage 122 for tenant data 123, the system data storage 124 for system data 125 accessible to system 116 and possibly multiple tenants, the program code 126 for implementing various functions of the system 116, and the process space 128 for executing MTS system processes and tenant-specific processes, such as running applications as part of an application hosting service. Additional processes that may execute on system 116 include database indexing processes.

Several elements in the system shown in FIG. 1 include conventional, well-known elements that are explained only briefly here. For example, each of the user systems 112 could include a desktop personal computer, workstation, laptop, notepad computer, PDA, cell phone, or any wireless access protocol (WAP) enabled device or any other computing device capable of interfacing directly or indirectly to the Internet or other network connection. Each of the user systems 112 typically runs an HTTP client, e.g., a browsing program, such as Microsoft's Internet Explorer browser, Netscape's Navigator browser, Opera's browser, or a WAP-enabled browser in the case of a cell phone, notepad computer, PDA or other wireless device, or the like, allowing a user (e.g., subscriber of the multi-tenant database system) of the user systems 112 to access, process, and view information, pages, and applications available to it from the system 116 over the network 114. Each of the user systems 112 also typically includes one or more user interface devices, such as a keyboard, a mouse, trackball, touch pad, touch screen, pen or the like, for interacting with a graphical user interface (GUI) provided by the browser on a display (e.g., a monitor screen, liquid crystal display (LCD) monitor, light emitting diode (LED) monitor, organic light emitting diode (OLED) monitor, etc.) in conjunction with pages, forms, applications, and other information provided by the system 116 or other systems or servers. For example, the user interface device can be used to access data and applications hosted by system 116, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each of the user systems 112 and all of its components are operator configurable using applications, such as a browser, including computer code run using a central processing unit such as an Intel Pentium® processor or the like. Similarly, system 116 (and additional instances of an MTS, where more than one is present) and all of their components might be operator configurable using application(s) including computer code to run using a central processing unit such as the processor system 117, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring the system 116 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a read only memory (ROM) or random-access memory (RAM), or provided on any media capable of storing program code, such as any type of rotating media including floppy disks, optical discs, digital versatile disk (DVD), compact disk (CD), microdrive, and magneto-optical disks, and magnetic or optical cards, nano-systems (including molecular memory integrated circuits (ICs)), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, virtual private network (VPN), LAN, etc.) using any communication medium and protocols (e.g., TCP/IP, HTTP, HTTPS, Ethernet, etc.) as are well known. It will also be appreciated that computer code for implementing embodiments of the present disclosure can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun MicroSystems, Inc.).

According to one embodiment, the system 116 is configured to provide webpages, forms, applications, data and media content to the user (client) systems 112 to support the access by the user systems 112 as tenants of the system 116. As such, the system 116 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., object oriented data base management system (OODBMS) or rational database management system (RDBMS)) as is well known in the art. It should also be understood that "server system" and "server" are often used interchangeably herein. Similarly, the database management system described herein can be implemented as single databases, a distributed database, a collection of distributed databases, a database with redundant online or offline backups or other redundancies, etc., and might include a distributed database or storage network and associated processing intelligence.

Figure 2:
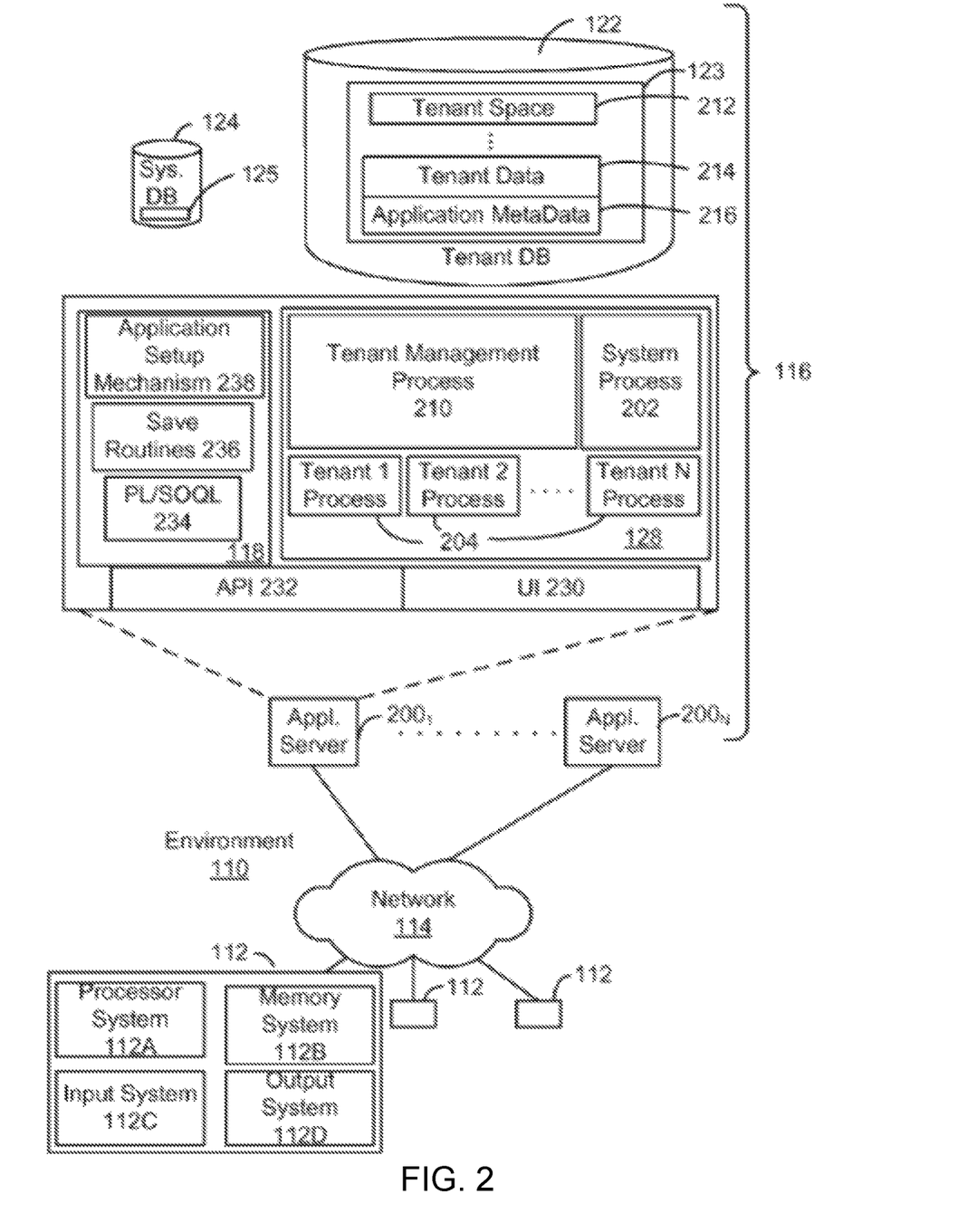
FIG. 2 illustrates a block diagram of another example environment according to some embodiments.

FIG. 2 also illustrates the environment 110, which may be used to implement embodiments described herein. FIG. 2 further illustrates elements of system 116 and various interconnections, according to some embodiments. FIG. 2 shows that each of the user systems 112 may include a processor system 112A, a memory system 112B, an input system 112C, and an output system 112D. FIG. 2 shows the network 114 and the system 116. FIG. 2 also shows that the system 116 may include the tenant data storage 122, the tenant data 123, the system data storage 124, the system data 125, a user interface (UI) 230, an application program interface (API) 232, a PL/Salesforce.com object query language (PL/SOQL) 234, save routines 236, an application setup mechanism 238, applications servers $200_1$-$200_N$, a system process space 202, tenant process spaces 204, a tenant management process space 210, a tenant storage area 212, a user storage 214, and application metadata 216. In other embodiments, environment 110 may not have the same elements as those listed above and/or may have other elements instead of, or in addition to, those listed above.

The user systems 112, the network 114, the system 116, the tenant data storage 122, and the system data storage 124 were discussed above in FIG. 1. Regarding the user systems 112, the processor system 112A may be any combination of one or more processors. The memory system 112B may be any combination of one or more memory devices, short term, and/or long term memory. The input system 112C may be any combination of input devices, such as one or more keyboards, mice, trackballs, scanners, cameras, and/or interfaces to networks. The output system 112D may be any combination of output devices, such as one or more monitors, printers, and/or interfaces to networks. As shown in FIG. 2, the system 116 may include the network interface 120 (of FIG. 1) implemented as a set of HTTP application servers 200, the application platform 118, the tenant data storage 122, and the system data storage 124. Also shown is system process space 202, including individual tenant process spaces 204 and the tenant management process space 210. Each application server 200 may be configured to access tenant data storage 122 and the tenant data 123 therein, and the system data storage 124 and the system data 125 therein to serve requests of the user systems 112. The tenant data 123 might be divided into individual tenant storage areas 212, which can be either a physical arrangement and/or a logical arrangement of data. Within each tenant storage area 212, the user storage 214 and the application metadata 216 might be similarly allocated for each user. For example, a copy of a users most recently used (MRU) items might be stored to the user storage 214. Similarly, a copy of MRU items for an entire organization that is a tenant might be stored to the tenant storage area 212. The UI 230 provides a user interface and the API 232 provides an application programmer interface to the system 116 resident processes and to users and/or developers at the user systems 112. The tenant data and the system data may be stored in various databases, such as one or more Oracle™ databases.

The application platform 118 includes an application setup mechanism 238 that supports application developers' creation and management of applications, which may be saved as metadata into tenant data storage 122 by the save routines 236 for execution by subscribers as one or more tenant process spaces 204 managed by the tenant management process 210, for example. Invocations to such applications may be coded using PL/SOQL 234 that provides a programming language style interface extension to the API 232. Some embodiments of PL/SOQL language are discussed in further detail in U.S. Pat. No. 7,730,478, filed Sep. 21, 2007, entitled, "Method and System For Allowing Access to Developed Applications Via a Multi-Tenant On-Demand Database Service," which is incorporated herein by reference. Invocations to applications may be detected by one or more system processes, which manage retrieving the application metadata 216 for the subscriber, making the invocation and executing the metadata as an application in a virtual machine.

Each application server 200 may be communicably coupled to database systems, e.g., having access to the system data 125 and the tenant data 123, via a different network connection. For example, one application server $200_1$ might be coupled via the network 114 (e.g., the Internet), another application server $200_{N-1}$ might be coupled via a direct network link, and another application server $200_N$ might be coupled by yet a different network connection. Transfer Control Protocol and Internet Protocol (TCP/IP) are typical protocols for communicating between application servers 200 and the database system. However, it will be apparent to one skilled in the art that other transport protocols may be used to optimize the system depending on the network connection used.

In certain embodiments, each application server 200 is configured to handle requests for any user associated with any organization that is a tenant. Because it is desirable to be able to add and remove application servers from the server pool at any time for any reason, there is preferably no server affinity for a user and/or organization to a specific application server 200. In one embodiment, therefore, an interface system implementing a load balancing function (e.g., an F5 Big-IP load balancer) is communicably coupled between the application servers 200 and the user systems 112 to distribute requests to the application servers 200. In one embodiment, the load balancer uses a least connections algorithm to route user requests to the application servers 200. Other examples of load balancing algorithms, such as round robin and observed response time, also can be used. For example, in certain embodiments, three consecutive requests from the same user could hit three different application servers 200, and three requests from different users could hit the same application server 200. In this manner, the system 116 is multi-tenant, wherein the system 116 handles storage of, and access to, different objects, data and applications across disparate users and organizations.

As an example of storage, one tenant might be a company that employs a sales force where each salesperson uses the system 116 to manage his or her sales process. Thus, a user might maintain contact data, leads data, customer follow-up data, performance data, goals and progress data, etc., all applicable to that user's personal sales process (e.g., in the tenant data storage 122). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by the system 116 that are allocated at the tenant level while other data structures might be managed at the user level. Because a MTS might support multiple tenants including possible competitors, the MTS should have security protocols that keep data, applications, and application use separate. Also, because many tenants may opt for access to a MTS rather than maintain their own system, redundancy, up-time, and backup are additional functions that may be implemented in the MTS. In addition to user-specific data and tenant specific data, the system 116 might also maintain system level data usable by multiple tenants or other data. Such system level data might include industry reports, news, postings, and the like that are sharable among tenants.

In certain embodiments, the user systems 112 (which may be client systems) communicate with the application servers 200 to request and update system-level and tenant-level data from the system 116 that may require sending one or more queries to the tenant data storage 122 and/or the system data storage 124. The system 116 (e.g., an application server 200 in the system 116) automatically generates one or more structured query language (SQL) statements (e.g., one or more SQL queries) that are designed to access the desired information. The system data storage 124 may generate query plans to access the requested data from the database.

In a database system, such as system 116 shown and described with respect to FIGS. 1 and 2, data or information may be organized or arranged in categories or groupings. Each database can generally be viewed as a collection of objects, such as a set of logical tables, containing data fitted into predefined categories. A "table" is one representation of a data object and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. Each table or object may be encrypted as discussed herein. In a customer relationship management (CRM) system, for example, these categories or groupings can include various standard blob data for customers or developers using the CRM systems clients and services, including documents, files, attachments, content, etc. In some multi-tenant database systems, case tables might be provided for use by all tenants or may be only viewable by some tenants and agents (e.g., users and administrators) of the system.

In some multi-tenant database systems, tenants may be allowed to create and store custom objects, or they may be allowed to customize standard entities or objects, for example by creating custom fields for standard objects, including custom index fields. Systems and methods for creating custom objects as well as customizing standard objects in a multi-tenant database system are described in further detail in U.S. Pat. No. 7,779,039, filed Apr. 2, 2004, entitled "Custom Entities and Fields in a Multi-Tenant Database System," which is incorporated herein by reference. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

The multi-tenant database system 116 described above may be accessed and used by a number of customers, clients, or other persons (generally, "users"), regarding an inquiry, problem, question, issue, support-related matter, etc. To facilitate interaction between the database system 116 and the user, a search bar, voice interface, or similar user interface tool is provided. The search tool allows a user to query the database to access information or data concerning or relating to various objects or entities relevant to the user.

For large databases with many records and information that service many customers, there may be a requirement for data encryption when stored. For example, the regulatory requirements may require that encryption of customer data occur when stored to databases in order to meet licensing or other standards. Thus, a database system's system requires an encryption framework. However, encryption of data at a server-side or operating-system level may not provide particular flexibility to be highly available across multiple environments and with different key service providers. Thus, a client level encryption framework may allow for encryption of blob data prior to transmission and storage by the database management system so that the system may provide secure storage of data and data retrieval by the client level applications and systems. As such, according to some embodiments, systems and methods are provided for a highly available encryption framework for multiple different computing environments.

Encryption Framework

According to some embodiments, in a multi-tenant database system accessible by a plurality of separate and distinct organizations, such as system 116 shown and described with respect to FIGS. 1 and 2, an encryption framework is provided that is highly available by having pluggable encryption modules to provide data encryption in different runtime environment, thereby providing client-side data encryption and security for networked database system transmission and data writing.

Figure 3:
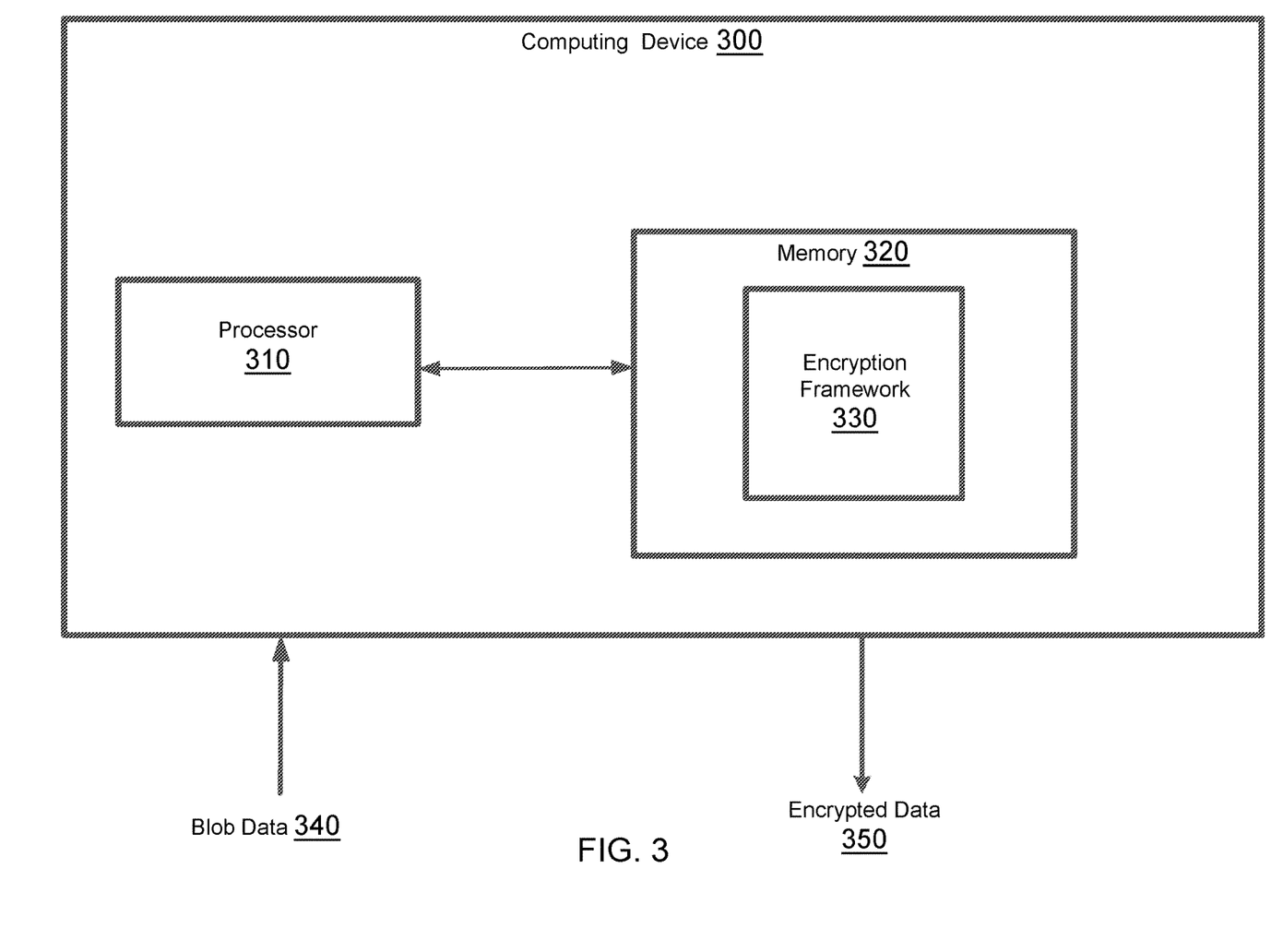
FIG. 3 is a simplified diagram of a computing device according to some embodiments.

FIG. 3 is a simplified diagram of a computing device 300 according to some embodiments. As shown in FIG. 3, computing device 300 includes a processor 310 coupled to memory 320. Operation of computing device 300 is controlled by processor 310. And although computing device 300 is shown with only one processor 310, it is understood that processor 310 may be representative of one or more central processing units, multi-core processors, microprocessors, microcontrollers, digital signal processors, field programmable gate arrays (FPGAs), application specific integrated circuits (ASICs), graphics processing units (GPUs), tensor processing units (TPUs), and/or the like in computing device 300. Computing device 300 may be implemented as a stand-alone subsystem, as a board added to a computing device, and/or as a virtual machine.

Memory 320 may be used to store software executed by computing device 300 and/or one or more data structures used during operation of computing device 300. Memory 320 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 310 and/or memory 320 may be arranged in any suitable physical arrangement. In some embodiments, processor 310 and/or memory 320 may be implemented on a same board, in a same package (e.g., system-in-package), on a same chip (e.g., system-on-chip), and/or the like. In some embodiments, processor 310 and/or memory 320 may include distributed, virtualized, and/or containerized computing resources. Consistent with such embodiments, processor 310 and/or memory 320 may be located in one or more data centers and/or cloud computing facilities. In some examples, memory 320 may include non-transitory, tangible, machine readable media that includes executable code that when run by one or more processors (e.g., processor 310) may cause the one or more processors to perform any of the methods described further herein.

As shown, memory 320 includes an encryption framework 330. Encryption provides a process for data security where data is encoded in such a manner that only authorized users may access and view the data without large and time extensive encryption cracking processes or fraudulently acquiring information necessary to read the data. Generally, encryption works by utilizing a particular encryption "key" or piece of information with a cryptographic algorithm (e.g., a cipher) to convert plain text to cipher text. The cipher text is unreadable without the use of a decryption key and algorithm that allows for retrieval of the plain text. There are generally two commonly used encryption schemes, symmetric key encryption where the encryption and decryption key are the same and asymmetric key encryption where a first "public" key may be used for encryption but only a secret "private" key allows for decryption. Encryption remains widely used for data transmission and storage so that plain text is not easily accessible by would-be hackers or malicious parties and so that any misappropriated data remains unusable.

Encryption framework 330 may be used to implement and/or emulate any of the encryption processes and feature described further herein. In some examples, encryption framework 330 may be associated or provided with a client-side application and service that executes on computing device 300. According to some embodiments, the encryption framework 330 may be a framework built and integrated in a standard client provided to computing device 300 when utilizing the multi-tenant database system described herein to create, manage, and execute applications and application data. This is described in more detail below.

After implementing and executing the encryption framework 330, in some embodiments, the encryption provided by encryption framework 330 is global for the multi-tenant database system, such as system 116, and applied to or used for all organizations or tenants whose users or customers utilize system 116 for data object generation, management, and use. Computing device 300 may receive or intake blob data 340 (e.g., a customer's data, including plain text, applications and application content, etc.) from a user of an organization or tenant accessing the database system. Blob data 340 can be any type data in that it can take the form of text, binary data, multi-media content, etc. Thus, blob data 340 may correspond to a data object utilized in a runtime environment on computing device 300. In some embodiments, blob data 340 is not constrained, restricted, or required to be in a particular form. Computing device 300 can receive the blob data 340 through a user interface.

The computing device 300, using the encryption modules and processes of encryption framework 330, generates encrypted data 350, which results from the blob data 340 using the encryption modules and processes. For example, for a customer (e.g., a user or an organization of the system) the computing device 300 may input or provide some initial blob data 340 or blob data 340 may be generated during use of services and applications provided by the multi-tenant database system. The user may then request that blob data 340 be encrypted and stored using encryption framework 330 and one or more networked databases of the multi-tenant database system. An example of the relevant input data for the encryption processes is described in reference to FIG. 4A. Encryption framework 330 may include at least one encryption module compatible with the runtime environment currently being used or used for reading/executing blob data 340. However, encryption framework 330 may also include multiple encryption modules utilized for other different runtime environments, such as other runtime environments that blob data 340 may be used in or accessed through (which may be limited or specialized due to time, location, tenant, instance, etc.). Encryption framework 330 may encrypt blob data 340 using a content encryption key (CEK) to generate encrypted blob data. The CEK is further wrapped (encrypted) by a wrapping encryption key, also referred to as a master key, from a key service provider, and wrapping algorithm provided by the one or more encryption modules of encryption framework 330. Encryption framework 330 may also generate encryption metadata that includes the wrapped CEK, the master key identifier, and a last time of modification of the master key. Thus, encrypted data 350 includes both blob data 340 encrypted using the CEK and the encryption metadata. An example of the resulting encryption metadata and encrypted blob data is described in reference to FIG. 4B.

Figure 4A:
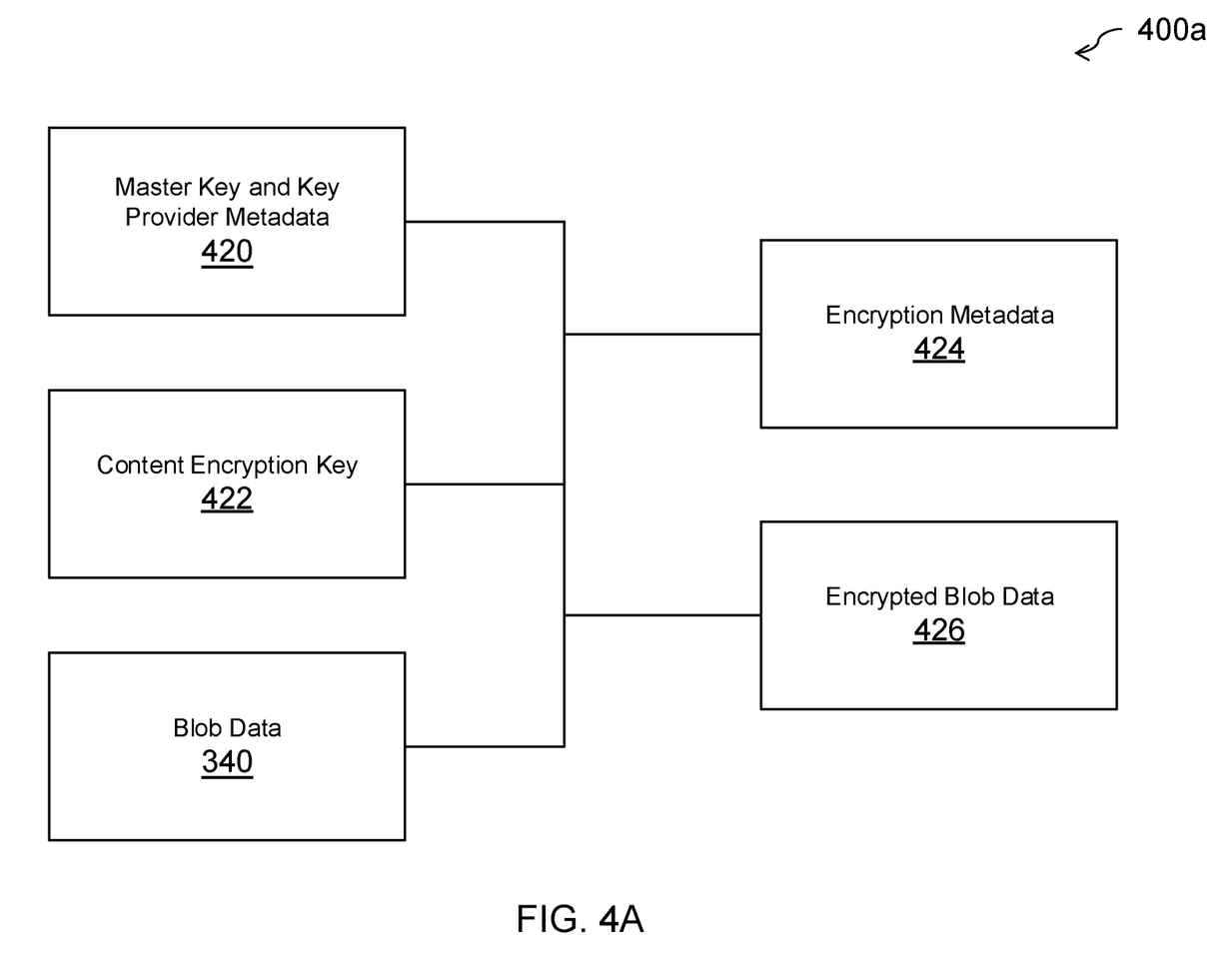
FIG. 4A is a simplified diagram of data used in an encryption framework to encrypt blob data client-side according to some embodiments.
Figure 4B:
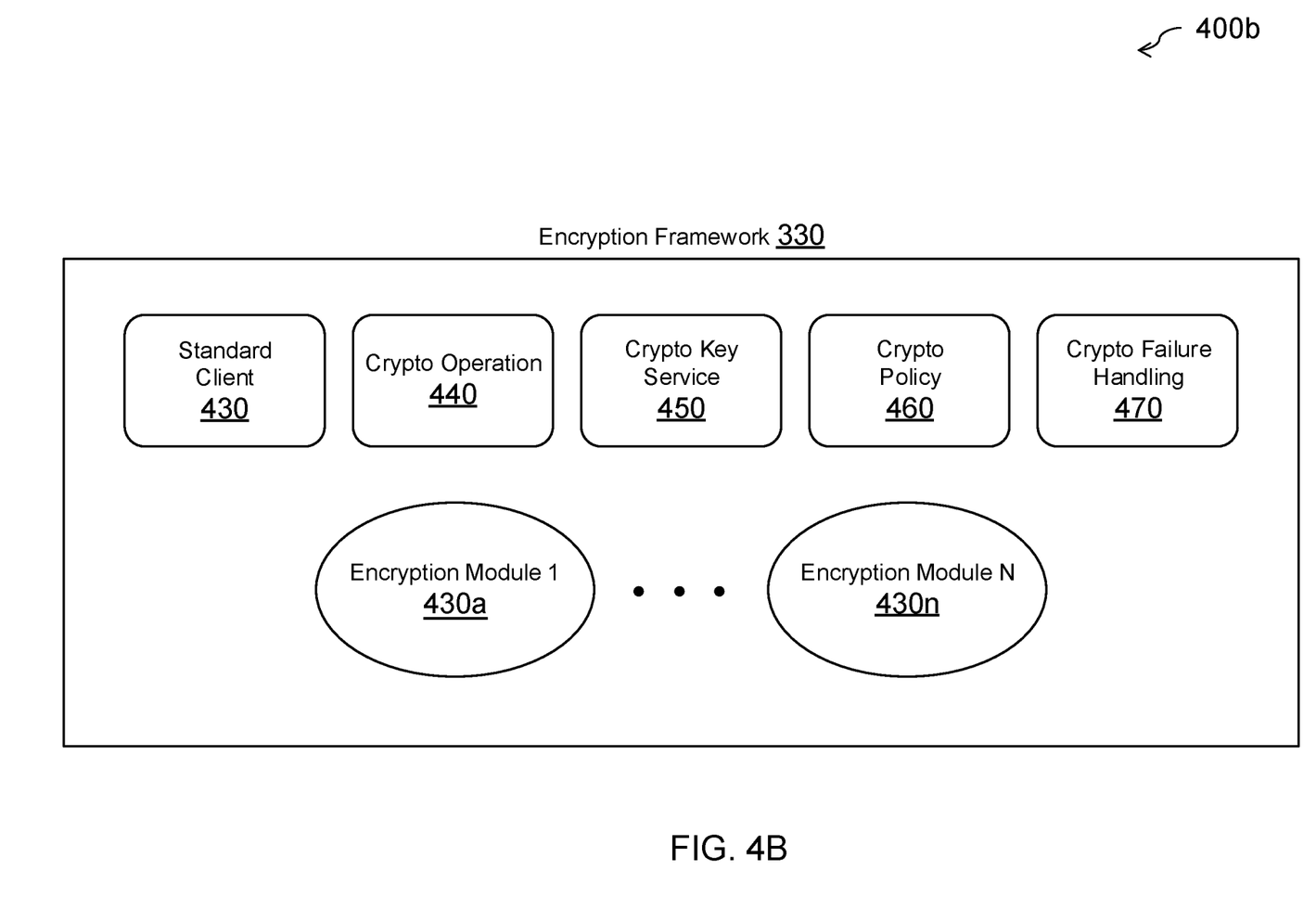
FIG. 4B is a simplified diagram of the processes and modules of a client-side encryption framework according to some embodiments.
Figure 5:
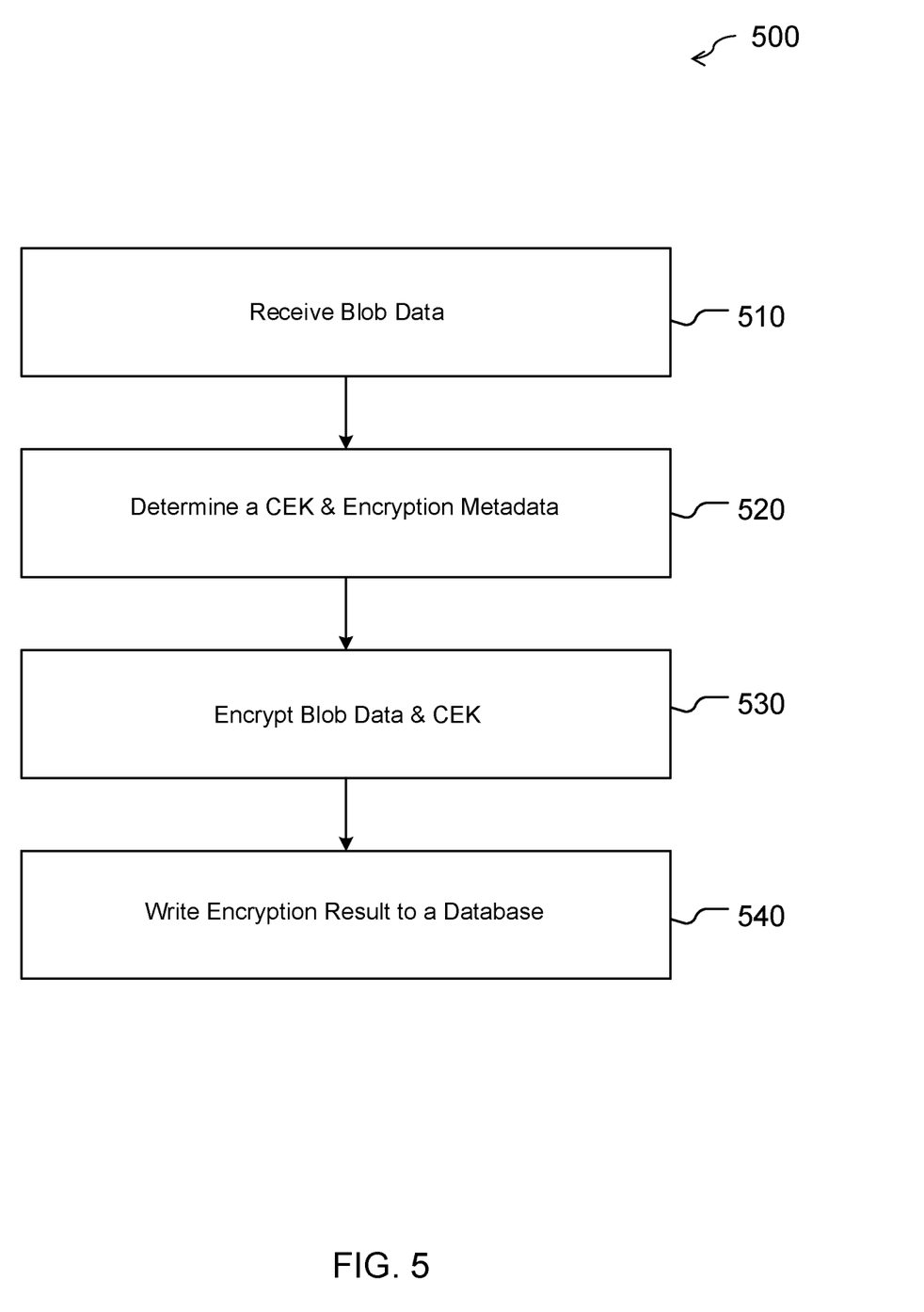
FIG. 5 is a simplified diagram of a method of encrypting data client-side using an encrypting framework and writing the data to networked database storage according to some embodiments.
Figure 6:
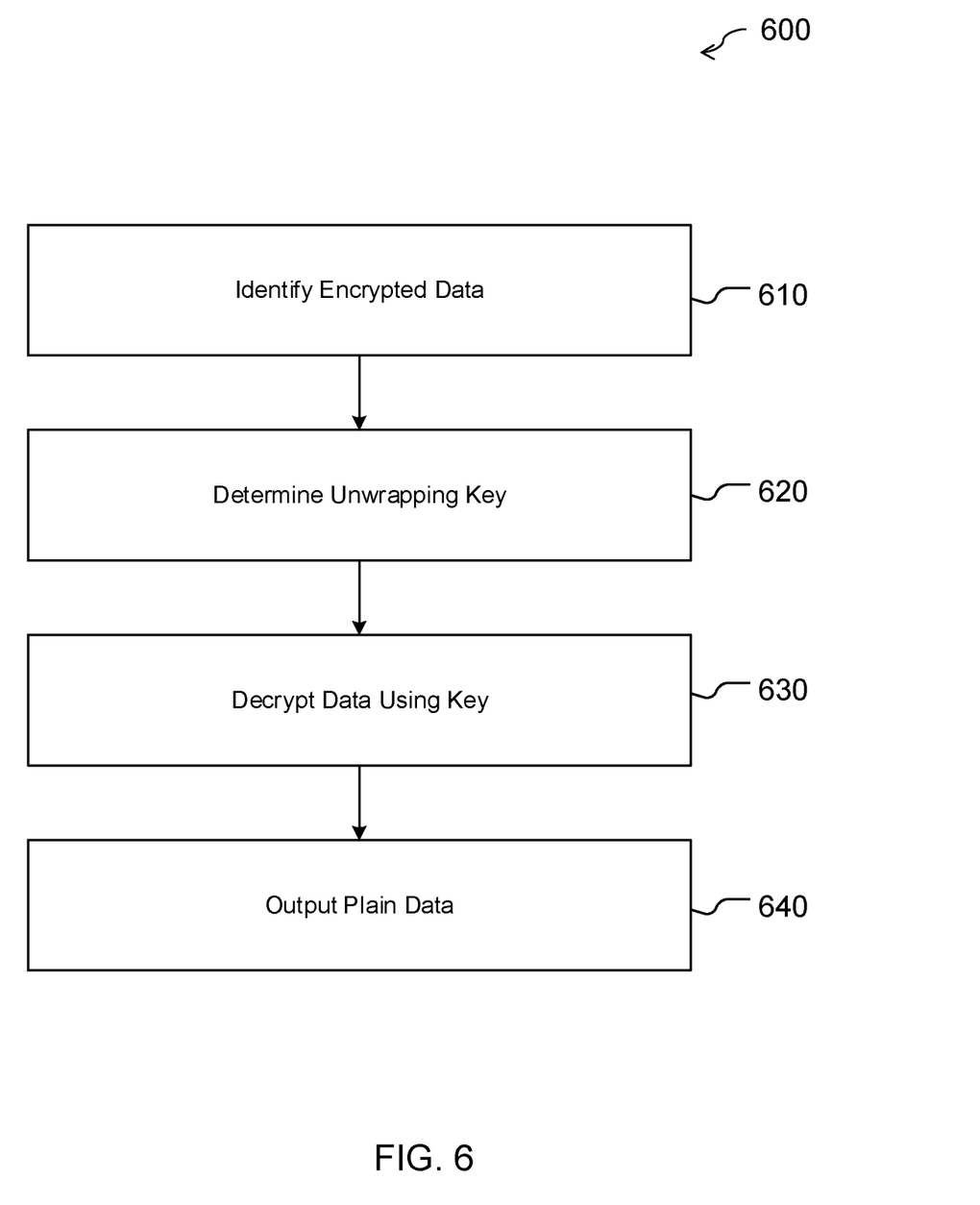
FIG. 6 is a simplified diagram of a method for retrieving and decrypting blob data from networked database storage according to some embodiments.

FIG. 4A is a simplified diagram of data used in an encryption framework to encrypt blob data client-side according to some embodiments. FIG. 4B is a simplified diagram of the processes and modules of a client-side encryption framework according to some embodiments. FIG. 5 is a simplified diagram of a method of encrypting data client-side using an encrypting framework and writing the data to networked database storage using the data described in reference to FIG. 4A and the processes and modules of FIG. 4B according to some embodiments. And FIG. 6 is a simplified diagram of a method for retrieving and decrypting blob data from networked database storage according to some embodiments. In some embodiments, the encryption framework, processes, and modules described in reference to FIGS. 4A, 4B, 5, and 6 can be an implementation of the encryption framework 330 of computing device 300.

One or more of the processes 510-540 of method 500 and 610-640 of method 600 may be implemented, at least in part, in the form of executable code stored on non-transitory, tangible, machine-readable media that when run by one or more processors may cause the one or more processors to perform one or more of the processes 510-540 and 610-640. In some embodiments, methods 500 and 600 can be performed by one or more computing devices in environment 110 of FIGS. 1 and 2.

The processes and modules of encryption framework 330 provide data object encryption and writing in a database system (e.g. CRM system 116) based on encryption modules for key service providers implemented in encryption framework 330. In some embodiments, these include the data objects that may be standard for the services and applications provided by a multi-tenant database system for customers of a CRM system.

To accomplish this, and with reference to FIGS. 4A, 4B, 5, and 6, the method 500 starts with a process 510. At process 510, the encryption framework 330 receives blob data 340, which may correspond to input to or generated by a client-side application/service of a standard client for the multi-tenant database system. For example, standard client 430 in computing device environment 400b may be a part of encryption framework 330 and may be used for standard blob reading and writing operations. Standard client 430 may be used for communication with one or more server and/or network server database systems for use in encrypted data writing and retrieval of encrypted data for decryption.

After receiving blob data 340, at process 520, a CEK and encryption metadata is determined for blob data 340 based on the one or more encryption modules of encryption framework. In order to determine content encryption key (CEK) 422 and encryption metadata 424 in encryption data 400a of FIG. 4A, encryption framework 330 may first invoke some encryption processes. For example, crypto operation 440 may be invoked to provide cryptographic computations for encryption and decryption behaviors. Blob data 340 may be required to be encrypted by CEK 422, which is then wrapped using a master key and key wrapping algorithm. CEK 422 (e.g., a symmetric CEK) may be required to decrypt the data. Thus, crypto operation 440 may be used to determine CEK 422 and the encryption algorithm (e.g., AES/CGM, AES/CBC, or other encryption algorithm) to encrypt blob data 340. Crypto operation 440 may therefore define one or more commands and interfaces for encrypting and decrypting blob data 340.

Crypto operation 440 may also be utilized with crypto key service 450 to obtain one or more master keys and wrapping algorithms used to encrypt or wrap CEK 422 determined by crypto operation 440. Crypto key service 450 relies on one or more internal or external cryptographic key service providers to provide the master key (e.g., a wrapping key) and wrapping algorithm, which may be encryption module 1 430a through encryption module N 430n. Encryption module 1 430a through encryption module N 430n describes the module encryption modules registered and implemented within encryption framework 330. Each of encryption module 1 430a through encryption module N 430n relies on a key service provider and a key wrapping algorithm to encrypt a CEK. A key wrapping algorithm is a form of key encapsulation for CEK 422 intended for a multi-tenant database system that provides confidentiality for CEKs. Encryption module 1 430a through encryption module N 430n implemented with crypto key service 450 so that crypto key service 450 provides commands and interfaces to retrieve the currently active master key from the key service provider (e.g., the most recent valid key). This allows crypto operation 440 of encryption framework 330 to determine the master key metadata, as well as wrap CEK 422. Additionally, encryption module 1 430a through encryption module N 430n are required for retrieval of the corresponding master key during CEK unwrapping when using a master key identifier from stored encryption metadata.

When registering and implementing encryption module 1 430a through encryption module N 430n with encryption framework 330, encryption framework 330 and/or a user implementing one or more of encryption module 1 430a through encryption module N 430n may be required to process multiple considerations prior to registration of encryption module 1 430a through encryption module N 430n to insure proper use and functionality in encryption framework 330. For example, key scope defines the effective radius of a master key and therefore indirectly specifies the limitation on the encryption module. This may be defined by global keys that work across different data centers, realm keys that are specific to a particular realm (e.g., geo-location areas for data centers), data center specific keys for only certain data centers, and/or interface keys for a specific instance running on a data center. Key type, which may fall under per-tenant keys or shared keys may also define key limitations and choice of encryption modules. Per-tenant keys are different between tenants, which prevents theft and tampering, while shared keys are easier to produce but exposed to multiple tenants. Finally, key source may also be considered, and corresponds to the location of the key service provider. Where the key source is for an internal key service provider associated with the multi-tenant database platform, the encryption module may be offered to customers from that platform. However, customers may also bring a customer key where the customer needs to control the master key.

In some embodiments, encryption framework 330 may further generate a new set of encryption metadata for a newly registered module of encryption module 1 430a through encryption module N 430n. The metadata for a newly registered module may include a master key identifier for the master key provided by the key service provider, an encrypted CEK using the master key, and a last modified time of the master key. This metadata may therefore be used for identification of the master key and unwrapping of the CEK in order to decrypt stored blob data on a server database. Instead of extending encryption metadata when a new module is registered, a versioning system may be used so that crypto operation 440 is capable of updating and reading the correct version of the metadata to find the correct master key. The versioning system may bump a version of the metadata after registration of each new encryption module of encryption module 1 430a through encryption module N 430n.

A control plane may also be implemented to control release and running of a newly registered encryption module. For example, the control plane may allow for incremental deployment, where the control plane allows for activation and deactivation of one of encryption module 1 430a through encryption module N 430n based on predefined conditions, including pod/instance, host, data center, geo-location, date, time, etc. This allows the encryption module to be implemented in a deterministic fashion. The control plane may also allow for an emergency stop if there are failures related to data or key security. Additionally, the control plane may provide service migration as well, where an encryption module with a key service provider that may discontinue may be shifted away from and to another encryption module without extra changes of code and/or deployment of further encryption modules.

Once one or more encryption modules are registered and functional with encryption framework 330, master key and key provider metadata 420 may also be determined at process 520 for use in encryption of blob data 340 with CEK 422. Master key and key provider metadata 420 may be determined by retrieving the master key used for wrapping CEK 422 from the corresponding key service provider and determining a master key identifier and last time of updating of the master key from the key service provider. Additionally, a wrapping algorithm associated with the master key and key service provider may also be retrieved at process 520 for use in process 530. The master key, wrapping algorithm, and key provider metadata may be retrieved by each encryption module, or a subset of the encryption modules may be used. For example, specific runtime environments may dictate the selection of the encryption modules used at process 530, or the user may select the encryption modules. Additionally, crypto policy 460 may coordinate the use of the encryption modules.

Crypto policy 460 may correspond to a policy engine to handle customized policies for encryption and decryption. Specific data may work across multiple tenants, such as templates, and therefore a document template that is encrypted with an encryption module for a specific tenant would prevent reuse and reading by other tenants. Similarly, constrained environments, such as by geo-location, law/regulation, or business requirement, may require specific encryption modules. Thus, crypto policy 460 may be invoked to resolve issues and coordinate usage of encryption modules.

At process 530, CEK 422 and blob data 340 are encrypted using the master key and wrapping algorithm to generate encryption metadata 424 and encrypted blob data 426. At process 520, crypto policy 460 and/or other encryption module selections and parameters may be used to select all participating encryption modules, where crypto key service 450 retrieves all master keys, key wrapping algorithms, and last modified key time (and other key metadata). Once all are collected, crypto operation 440 then creates a copy of encryption metadata and CEK 422 for blob data 340 at process 530. Next, a list of each participating encryption module is generated for the encryption metadata and utilizes each modules master key and key wrapping algorithm to encrypt CEK 422. Once done, all the master key identifiers, encrypted CEKs from CEK 422, and last modified key time are stored to the encryption metadata to generate encryption metadata 424. Finally, CEK 422 is used to encrypt blob data 340 to generate encrypted blob data 426. Encrypted metadata 424 and encrypted blob data 426 may correspond to an encryption result that may then be transmitted and written to a server database. At process 540, standard client 430 then writes the encryption result of encrypted metadata 424 and encrypted blob data 426 to a database through a write request to a networked server associated with the CRM system.

Crypto failure handling 470 may also be invoked during process 530 depending on any errors occurring during encryption. For example, crypto failure handling 470 handles errors during encryption. Crypto failure handling 470 may execute 3 tasks to handle unexpected errors. First, crypto failure handling 470 may log information to debug the issue, which may be tuned to be regulation compliant while still identifying the root cause. Second, crypto failure handling 470 may collect performance metrics and event metrics for post-processing and aggregation. Third, crypto failure handling may determine the severity of the error and whether any encryption module should continue. If the error is fatal in the system, crypto failure handling 470 may cancel the blob write request for blob data 340 and cause the blob write request to fail. A system administrator may then investigate and perform troubleshooting based on the collected data by crypto failure handling 470 and any additional information.

Method 600 of FIG. 6 demonstrates a process for decryption of encrypted blob data stored to a database utilising method 500 of FIG. 5. At process 610, encrypted blob data 426 is identified in a database. This may be done through a blob read request for blob data 426 transmitted to a server for the CRM system or other multi-tenant database system. Once encrypted blob data 426 is identified and returned to encryption framework 330 residing client-side with standard client 430, crypto policy 460 may interact with crypto key service 450 to determine the master keys and key unwrapping algorithms necessary to return CEK 422 from encryption metadata 424 at process 620. This may be done using the master key identifiers stored to encryption metadata 424. The master keys may be retrieved for all participating modules, or for one or more of the participating modules necessary for the current runtime environment of the client device. At process 630, CEK 422 may be decrypted by crypto operation 440 using the master key(s) and the unwrapping algorithms from the key service provider(s). Once CEK 422 has been returned, crypto operation 440 may further decrypt encrypted blob data 426 using CEK 422. Finally, at process 640, the plain data may be output using standard client 430.

During storage, encryption metadata 424 may be required to be retrofitted and updated based on advancing versions of the metadata (e.g., registration of new encryption modules). For example, when addition of a newly registered encryption module occurs, update of encryption metadata 424 may be required (e.g., advancing of metadata versioning) in order to allow for retrieval of master keys for CEK 422 decryption and retrieval of blob data 340. Thus, each blob in storage may be required to be registered with all encryption modules so that all master keys may be retrievable. An asynchronous retrofitting process may be designed to fill the missing part on encryption metadata 424. The process may scan encryption metadata 424 stored to a catalog in a database and determine whether encryption metadata 424 is missing any metadata for additional encryption modules. The process provides a repair job on the metadata to include any additional master key identifiers, wrapped CEK 422 by the additional master keys, and master key modification or update time. This may be performed as a single database write transaction that interacts only with the database (e.g., not through a server) so that the process may not require server resources.

It may be required to update master keys based on security of the master keys and refreshing of the master keys by key service providers. If a new master key is found for a given encryption module, encryption framework 330 may wrap CEK 422 using the new master key and records the last modified date time for this master key by wrapping CEK 422 using the new master key. Since encryption metadata 424 includes the last time of update or modification of the master key, time limits set by key service provider and/or the last time of update may be used to determine if the master key is still valid. Thus, the key may be rotated in encryption metadata 424 based on expiry of the master keys.

In some embodiments, CEK 422 may also be required to be updated, for example, in the case of a CEK leak. In order to provide key rotation and update for CEK 422, a new CEK may be generated and used to re-encrypt blob data 340. After, the new CEK may be wrapped by all participating encryption modules and encryption metadata 424 may be updated based on the new CEK. The re-encrypted version of blob data 340 may then be written back to a server for storage.

As discussed above and further emphasized here, FIGS. 4A, 4B, 5, and 6, are merely examples of an encryption framework 330 and corresponding methods 500 and 600 for encryption and decryption of data which should not unduly limit the scope of the claims. One of ordinary skill in the art would recognize many variations, alternatives, and modifications.

Some examples of computing devices, such as computing device 300, may include non-transitory, tangible, machine readable media that include executable code that when run by one or more processors (e.g., processor 310) may cause the one or more processors to perform the processes of methods 500 and 600. Some common forms of machine readable media that may include the processes of methods 500 and 600 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modifications, changes and substitutions are contemplated in the foregoing disclosure and in some instances, some features of the embodiments may be employed without a corresponding use of other features. One of ordinary skill in the art would recognize many variations, alternatives, and modifications. Thus, the scope of the present application should be limited only by the following claims, and it is appropriate that the claims be construed broadly and in a manner consistent with the scope of the embodiments disclosed herein.

What is claimed is:

1. A system for data object encryption, the system comprising:
   an encryption framework available across a plurality of runtime environments;
   one or more hardware processors; and
   a non-transitory memory storing computer-executable instructions, that in response to execution by the one or more hardware processors, causes the system to:
     receive a data object in one of the plurality of runtime environments, wherein the data object is capable of being encrypted using a content encryption key;
     determine an encryption module implemented in the encryption framework that is compatible with the one of the plurality of runtime environments, wherein the encryption module comprises a key service provider that provides a master key and a key wrapping algorithm for the content encryption key in the runtime environment, and wherein the encryption module is a first one of a plurality of encryption modules;
     encrypt the data object using the content encryption key;
     encrypt the content encryption key using the master key and key wrapping algorithm;
     write the encrypted data object to networked database storage;
     determine encryption metadata for the data object based on the content encryption key and the master key, wherein the encryption metadata comprises a key identifier for the master key, the content encryption key encrypted by the master key, and modification data for a last time of modification of the master key;
     determine that a second one of the plurality of encryption modules is registered with the encryption framework after encrypting the data object and the content encryption key;
     scan the encryption metadata for the data object;
     determine that the encryption metadata is required to be updated based on the second one of the plurality of encryption modules being registered with the encryption framework after encrypting the data object and the content encryption key; and
     update the encryption metadata based on the second one of the plurality of encryption modules being registered after encrypting the data object and the content encryption key.

2. The system of claim 1, wherein the content encryption key is encrypted using each of the plurality of encryption modules, and wherein the content encryption key is recoverable through decryption by the each of the plurality of encryption modules.

3. The system of claim 2, wherein prior to determining the encryption module, the computer-executable instructions further cause the system to:
   determine the content encryption key for the data object; and
   retrieve a plurality of master keys including the master key from a plurality of key service providers including the key service provider using the plurality of encryption modules.

4. The system of claim 1, wherein the computer-executable instructions further cause the system to:
   determine that one of the content encryption key or the master key requires renewal;
   renew the one of the content encryption key or the master key; and
   update the encryption metadata based on the renewing.

5. The system of claim 1, wherein the computer-executable instructions further cause the system to:
   transmit a read request for the encrypted data object from the networked database storage;

receive the encrypted data object;
determine the master key and an unwrapping algorithm from the key service provider using the encryption metadata;
decrypt the content encryption key using the master key and the unwrapping algorithm; and
decrypt the encrypted data object using the content encryption key.

6. The system of claim 1, wherein prior to the system determining the encryption module, the computer-executable instructions further cause the system to:
integrate the key service provider with the encryption framework;
provide a first interface to return the master key currently available with the key service provider based on integrating the key service provider;
provide a second interface to retrieve the master key for decryption of the encrypted data object based on integrating the key service provider; and
activate the encryption module with the encryption framework based on the first interface and the second interface.

7. A method for data object encryption, the method comprising:
receiving a data object in one of a plurality of runtime environments associated with an encryption framework, wherein the data object is capable of being encrypted using a content encryption key, and wherein the encryption framework is available across the plurality of runtime environments;
determining an encryption module implemented in the encryption framework, wherein the encryption module comprises a key service provider that provides a master key and a key wrapping algorithm for the content encryption key in the runtime environment, and wherein the encryption module is a first one of a plurality of encryption modules;
encrypting the data object using the content encryption key;
encrypting the content encryption key using the master key and key wrapping algorithm;
writing the encrypted data object to networked database storage;
determining encryption metadata for the data object based on the content encryption key and the master key, wherein the encryption metadata comprises a key identifier for the master key, the content encryption key encrypted by the master key, and modification data for a last time of modification of the master key;
determining that a second one of the plurality of encryption modules is registered with the encryption framework after encrypting the data object and the content encryption key;
scanning the encryption metadata for the data object;
determining that the encryption metadata is required to be updated based on the second one of the plurality of encryption modules being registered with the encryption framework after encrypting the data object and the content encryption key; and
updating the encryption metadata based on the second one of the plurality of encryption modules being registered after encrypting the data object and the content encryption key.

8. The method of claim 7, wherein the content encryption key is encrypted using each of the plurality of encryption modules, and wherein the content encryption key is recoverable through decryption by the each of the plurality of encryption modules.

9. The method of claim 8, wherein prior to the determining the encryption module, the method further comprises:
determining the content encryption key for the data object; and
retrieving a plurality of master keys including the master key from a plurality of key service providers including the key service provider using the plurality of encryption modules.

10. The method of claim 7, further comprising:
determining that one of the content encryption key or the master key requires renewal;
renewing the one of the content encryption key or the master key; and
updating the encryption metadata based on the renewing.

11. The method of claim 7, further comprising:
transmitting a read request for the encrypted data object from the networked database storage;
receiving the encrypted data object;
determining the master key and an unwrapping algorithm from the key service provider using the encryption metadata;
decrypting the content encryption key using the master key and the unwrapping algorithm; and
decrypting the encrypted data object using the content encryption key.

12. The method of claim 7, wherein prior to the determining the encryption module, the method further comprises:
integrating the key service provider with the encryption framework;
providing a first interface to return the master key currently available with the key service provider based on integrating the key service provider;
providing a second interface to retrieve the master key for decryption of the encrypted data object based on integrating the key service provider; and
activating the encryption module with the encryption framework based on the first interface and the second interface.

13. A non-transitory machine readable medium having stored thereon instructions for performing a method comprising machine executable code which when executed by at least one machine, causes the machine to:
receive a data object in one of a plurality of runtime environments associated with an encryption framework, wherein the data object is capable of being encrypted using a content encryption key, and wherein the encryption framework is available across the plurality of runtime environments;
determine an encryption module implemented in the encryption framework that is compatible with the one of the plurality of runtime environments, wherein the encryption module comprises a key service provider that provides a master key and a key wrapping algorithm for the content encryption key in the runtime environment, and wherein the encryption module is a first one of a plurality of encryption modules;
encrypt the data object using the content encryption key;
encrypt the content encryption key using the master key and key wrapping algorithm;
write the encrypted data object to networked database storage;
determine encryption metadata for the data object based on the content encryption key and the master key, wherein the encryption metadata comprises a key identifier for the master key, the content encryption key encrypted by the master key, and modification data for a last time of modification of the master key;

determine that a second one of the plurality of encryption modules is registered with the encryption framework after encrypting the data object and the content encryption key;

scan the encryption metadata for the data object;

determine that the encryption metadata is required to be updated based on the second one of the plurality of encryption modules being registered with the encryption framework after encrypting the data object and the content encryption key; and update the encryption metadata based on the second one of the plurality of encryption modules being registered after encrypting the data object and the content encryption key.

14. The non-transitory machine readable medium of claim 13, wherein the content encryption key is encrypted using each of the plurality of encryption modules, and wherein the content encryption key is recoverable through decryption by the each of the plurality of encryption modules.

15. The non-transitory machine readable medium of claim 14, storing instructions which when executed by at least one machine, further causes the machine to:

prior to the machine determining the encryption module, determine the content encryption key for the data object; and retrieve a plurality of master keys including the master key from a plurality of key service providers including the key service provider using the plurality of encryption modules.

16. The non-transitory machine readable medium of claim 13, storing instructions which when executed by at least one machine, further causes the machine to:

determine that one of the content encryption key or the master key requires renewal;

renew the one of the content encryption key or the master key; and update the encryption metadata based on the renewing.

17. The non-transitory machine readable medium of claim 13, storing instructions which when executed by at least one machine, further causes the machine to:

transmit a read request for the encrypted data object to the networked database storage;

receive the encrypted data object;

determine the master key and an unwrapping algorithm from the key service provider using the encryption metadata;

decrypt the content encryption key using the master key and the unwrapping algorithm; and decrypt the encrypted data object using the content encryption key.

18. The non-transitory machine readable medium of claim 13, storing instructions which when executed by at least one machine, further causes the machine to:

prior to the machine determining the encryption module, integrate the key service provider with the encryption framework;

provide a first interface to return the master key currently available with the key service provider based on integrating the key service provider;

provide a second interface to retrieve the master key for decryption of the encrypted data object based on integrating the key service provider; and activate the encryption module with the encryption framework based on the first interface and the second interface.

* * * * *